June 5, 1956     E. K. BUCHY     2,748,389
STAPLER FOR SAUSAGE PACKAGE
Filed July 5, 1952
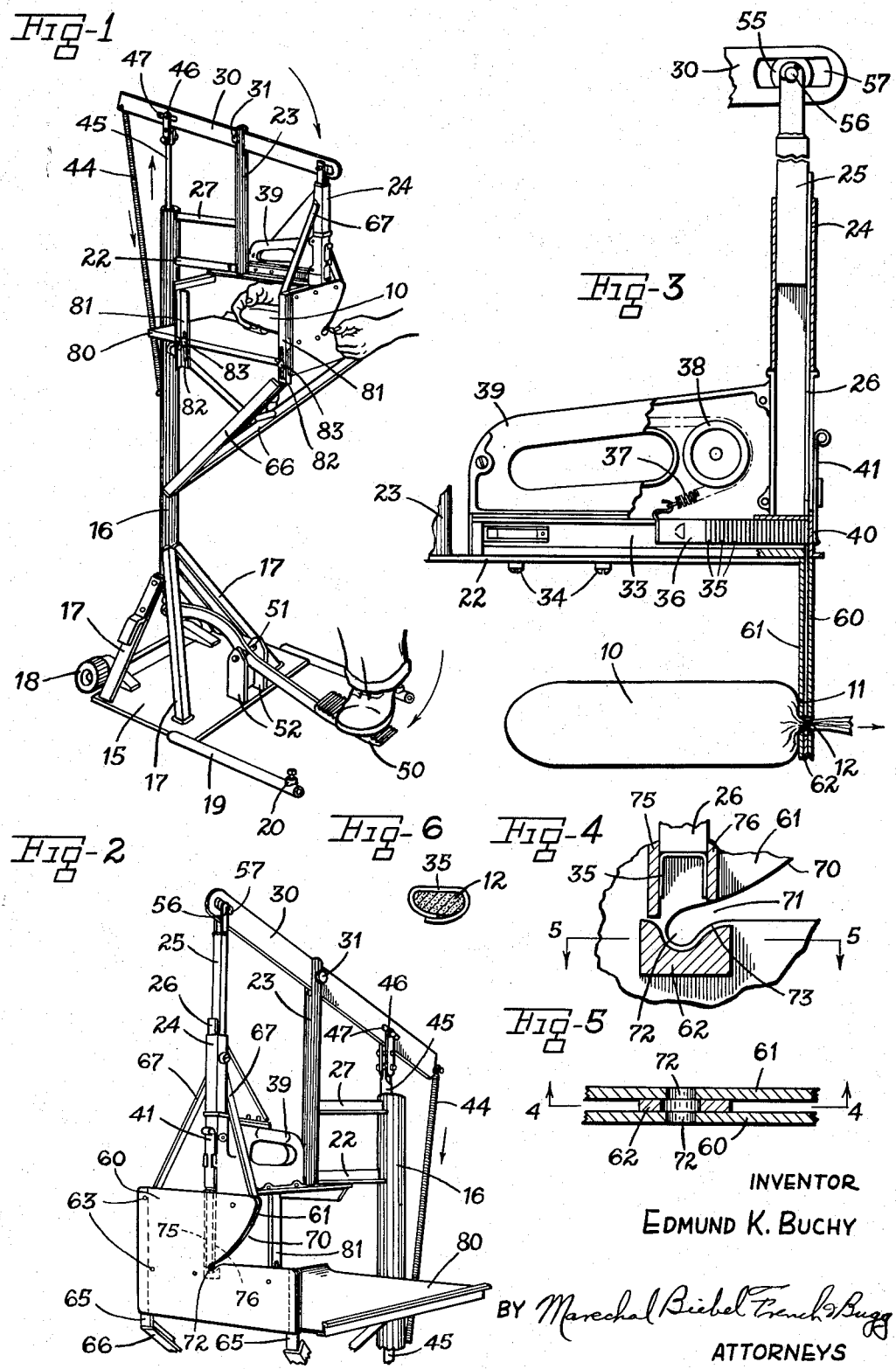
INVENTOR
EDMUND K. BUCHY
ATTORNEYS United States Patent Office 2,748,389
Patented June 5, 1956

2,748,389

STAPLER FOR SAUSAGE PACKAGE

Edmund K. Buchy, Greenville, Ohio

Application July 5, 1952, Serial No. 297,259

3 Claims. (Cl. 1—187)

This invention relates to apparatus for closing filled containers for sausages and the like.

In the commercial packing of sausage meat and sausage it is customary to fill a container or casing with ground meat, spices, preservatives, flavoring and other ingredients comprising the sausage mixture. Some products, such as bologna, liverwurst, salami and the like, are subjected to additional processing in the packing plant after having been packaged, whereas others, such as sausage meat, may be placed on the market without further processing. In either case, the container or casing is ordinarily formed of a thin, strong sheet material, which may be either a natural or a manufactured product intended to form a part of the finished product as in the case of many forms of sausage, or which may be a bag or container from which the contents are intended to be removed before use. Some containers or casings are baglike in shape, with one end already closed and requiring closing only at the other end, whereas others are tubular in form and must be closed at both ends. With either type, after the casing is filled to the desired extent, the material forming the end to be closed is pressed together to form a neck with the contents compressed tightly within the container or casing, and the end is then secured closed by tying or fastening a string, flexible wire, or other suitable means around the neck thus formed.

It is desirable that there be as little space as practicable within the container or casing between the point of sealing its closed end and the shoulder formed by the sausage mixture within it, in order that the package will be firm for subsequent handling and will have a pleasing appearance. It is also desirable, in the case of sausages which are processed after having been filled, to prevent an undue amount of the fat or grease ordinarily contained in a sausage mixture from collecting at the point of closing as it becomes soft and melted during treatment in the packing plant. Accordingly, the point of fastening should be as close as possible to the juncture at which the neck formed by the closed end portion of the casing meets the shoulder formed by the filled portion thereof.

A primary difficulty in the sealing operation is the problem of placing the fastening means close to this juncture of neck and shoulder. The filled container or casing is not rigid and is accordingly somewhat difficult to handle, and fastening a string or wire about the closed neck tends to be a somewhat clumsy operation which requires considerable experience and is time consuming. It is difficult also to obtain the uniformity of commercial product desirable in commercial practice.

The present invention successfully meets these difficulties and provides a simple and relatively inexpensive machine for sealing the closed ends of sausage containers and casings by means of staples. It leaves both hands of the operator free for holding and shaping the package, facilitating rapid operation and a high rate of production. At the same time, it permits placing the closure substantially at the point where the closed neck meets the shoulder in order to produce a firm, tightly closed package, while at the same time completely protecting the hands of the operator from being cut by a staple or injured in any way by the stapling mechanism, and thus it may be used without danger or fear by even inexperienced operators.

It is a primary object of the invention to provide a sausage stapling machine with which the operator may staple closed a filled sausage container or casing substantially at the point at which the neck formed by the gathered casing material meets the shoulder of the filled container or casing, while at the same time the operator's hands are fully protected from injury by the stapling mechanism.

Other objects and advantages of the present invention will be apparent from the following description, the accompanying drawing and the appended claims.

In the drawing—

Fig. 1 is a view in perspective showing the stapling machine in use in fastening one end of sausage casing the other end of which is already sealed;

Fig. 2 is a view in perspective on a larger scale showing the stapling machine from the operating side ready to receive a filled container or casing;

Fig. 3 is a side elevation, partly broken away and in section, showing a bag shaped sausage container in the stapling machine in position to have the neck thereof fastened by the staple;

Fig. 4 is a fragmentary sectional view on the line 4—4 of Fig. 5;

Fig. 5 is a fragmentary section on the line 5—5 of Fig. 4; and

Fig. 6 is a sectional view through the neck of a filled sausage casing showing the staple in sealing position.

Referring to the drawing, which illustrates a preferred embodiment of the invention, Fig. 1 shows a sausage stapling machine in use by an operator to staple closed the casing of a sausage 10 having shoulders 11 and a neck portion 12. The machine includes a base 15, a hollow upright frame member 16 and supports 17 for holding upright member 16 securely in position on the base. Wheels 18 are provided so that the machine may easily be moved about, and supports 19 are fastened to base 15 to give a broad firm base and are provided with adjustable screws 20 for adjusting the machine to any unevenness in the floor on which it is to be used.

A horizontal bar 22 extends transversely from frame member 16 and supports near its central point a second upright frame member 23 and at its outer end a sleeve 24 in which is slidably mounted plunger 25 which carries an elongated staple driver 26. Frame member 23 is further supported by a transverse brace 27, and its upper end is forked to receive a rocker arm 30 pivoted therein on a pivot 31. The bar 22 supports a staple magazine comprising a central rib 33 fastened to bar 22 by screws 34, as shown, or formed as an integral part thereof. The staples 35 are fed along rib 33 by a follower 36 and spring 37 passing around a pulley 38 in stapler housing 39, with the endmost staple being held by a stop 40 in position to be driven by staple driver 26. The stop 40 is removable to provide for loading the staple magazine and is shown as held in position by a slide 41.

The stapler plunger 25 is operated by the rocker arm 30, which is held with its forward end normally in raised position by a coil spring 44 fastened at opposite ends to the rearward end of the rocker arm and to frame member 16. Arm 30 is rocked around its pivot 31 by a drive rod 45, the upper end of which is connected to the rearward portion of the rocker arm by a clevis 46 connected through a slot 47 in the rocker arm. Drive rod 45 reciprocates in hollow member 16, as shown, and is pivoted at its lower end to the forward end of a foot treadle 50 mounted on stub axle 51 in brackets 52 on base 15. In order to compensate for the angular movement of arm 30 at its point of connection to plunger 25 this connection is formed by a block 55 pivoted at 56 to the forked upper ends of the plunger and slidable in a slot 57 in arm 30.

A pair of guide plates 60 and 61 enclose and support the anvil 62 for the stapling mechanism and cooperate with the anvil to define the work station of the machine. These plates are bolted or riveted together at 63 and are spaced from each other at their ends by straps 65 which are in turn supported at their lower ends by braces 66 extending diagonally upward from frame member 16. An additional brace 67 extends from each upper corner of plates 60 and 61 to the sleeve 24, and the upper edge of the plate 61 engages the under side of bar 22 and may be welded or otherwise secured thereto.

Plates 60 and 61 are notched at 70, the sides of the notches being in opposed parallel relationship and defining a throat 71 which is relatively wide at the end toward the operator and narrows to define a rounded slot 72 at a point immediately above anvil 62. Such slot should preferably be somewhat restricted at a point near its end to provide a restricted portion 73 for compressing and folding the material of the neck of a filled sausage casing as it is pressed into the slot by the operator. The slot 72 is widened somewhat beyond such restricted portion to form the rounded end portion, which should preferably not be materially larger in size than the closed neck of the casing to be held therein for stapling, as indicated in Figs. 3 and 4. The slot will thus allow room for the neck portion of the casing to adjust and fold upon itself during the stapling operation so as to be gripped and sealed by a staple as it is being closed, without being torn or injured, and to provide a smooth, rounded, tightly sealed closure.

Strips 75 and 76 are positioned between plates 60 and 61 extending from the staple magazine to a point immediately above anvil 62, and cooperate with such plates to define a staple-guide for guiding a staple as it is driven downward by staple driver 26, with the arms of the staple extending downward on either side of the neck of a casing in slot 72 for sealing. The parts are preferably so dimensioned as to utilize standard-sized square-topped staples which are readily available on the market and thus avoid having to obtain any special type of staple, and the end of staple driver 26 may accordingly be flat, as shown in the drawing. The face of anvil 62 is so shaped as to turn the ends of the staple arms inward towards each other, and as shown in Fig. 4 anvil 62 is preferably placed slightly below the edges of rounded slot 72 so that the edges of plates 60 and 61 defining the slot form with the top of the anvil a channel or guide causing the staple arms to pass each other so as to overlap and form the staple into a ring (Fig. 6) surrounding neck 12 of the casing.

The staple driver 26 should be mounted for sufficient downward movement to cause the staple to form a tight ringlike seal upon the sausage casing, without, however, pressing upon it so tightly as to tear or otherwise injure it. In order that the staple may be located as close as possible to shoulder 11, inner plate 61 forming the working face should be as thin as is consistent with providing a firm, unyieldable surface against which the operator may press the shoulder of the filled casing at the time of affixing the staple.

For convenience in operation, there is provided a work-supporting platform or table 80. In order that it may be raised or lowered in accordance with the size of the sausages being processed, the platform may be slidably mounted a convenient distance below rounded slot 72, as shown, in brackets 81 supported from horizontal bar 22 and plate 61, the brackets being slotted at 82 to receive bolts and wing nuts 83 to permit moving the platform and securing it at any convenient height.

In using the machine in commercial operations, the operator has both hands free to grasp a filled container or casing 10 with one hand and close its mouth tightly upon the contents with the other, twisting the closed neck 12 somewhat if desired, and thus shaping the unsealed end of the container into substantially the form shown in Fig. 3. The closed neck 12 may be fitted easily into the throat 71, the sides of which guide the filled container or casing as the operator pushes it forward through restricted portion 73, which tends to compress the material in the neck of the container further and form it into a compressed shape for being fastened as the operator presses shoulder 11 of the casing tightly against inner plate 61 with the body portion of the casing smooth and free from wrinkles. The material gathered and folded into the neck 12 is fairly bulky, and is so restricted by the rounded slot 72 as to extend straight through and leave minimum space between neck 12 and the contents of the casing.

The rounded slot of the end of throat is sufficiently small that it will prevent the operator's fingers from entering it and being cut or struck by a staple or the staple driver, and when a filled casing is fitted with its neck in the opening the shoulder of the package pressed against the plates covers the opening into slot 72 completely and the gathered material forming neck 12 effectually fills the slit above anvil 62. Additionally, both hands of the operator are normally engaged in holding the neck portion and the body portion of the sausage on opposite sides of the anvil and well removed therefrom, and both hands of the operator are entirely protected from possible injury by being cut or struck by the staple or staple driver. With the package so held, the operator closes a staple around the neck portion by pressing on foot treadle 50, and the thinness of inner plate 61 makes it possible to place the staple effectually at the juncture of the neck with shoulder 11, thus sealing the container closely upon the contents and avoiding any undesirable space between the contents and the point of closing.

Upon release of the treadle by the operator, rocker arm 31 lifts staple driver 26 to its initial position above magazine 34 and the sealed container or casing may be removed and the operation repeated.

While the form of apparatus herein described constitutes a preferred embodiment of the invention, it is to be understood that the invention is not limited to this precise form of apparatus, and that changes may be made therein without departing from the scope of the invention, which is defined in the appended claims.

What is claimed is:

1. A sausage stapling machine adapted for closing a staple around the neck of a filled sausage casing with minimum space between the contents of the casing and the point of closing comprising a staple magazine, an anvil, a staple driver mounted for driving successive staples from said magazine against said anvil, and a casing holder in fixed position relative to said anvil, said holder including a plate affixed at one side of said anvil, an inwardly converging throat in said plate spaced from said staple driver and defining at its inner end a restricted portion for receiving and confining the neck of said filled casing in closing position adjacent said anvil, one side of said plate forming a working face for receiving the shoulder of a filled casing pressed thereagainst and the other side of said plate forming guide means for guiding successive staples from said magazine to said casing neck close to the juncture of said neck and said shoulder for being closed around said neck against said anvil effectually at said juncture.

2. A sausage stapling machine adapted for closing a staple around the neck of a filled sausage casing with minimum space between the contents of the casing and the point of closing comprising a staple magazine, an anvil, a staple driver mounted for driving successive staples from said magazine against said anvil, and a casing holder in fixed position relative to said anvil, said holder including a plate extending between said magazine and said anvil, an inwardly converging throat in said plate spaced from said staple driver and defining at its inner end a restricted portion for receiving and confining the neck of said filled casing in closing position adjacent said anvil, one side of said plate forming a working face for receiving the shoulder of a filled casing pressed thereagainst and the other side of said plate forming guide means for guiding successive staples from said magazine to said casing neck close to the juncture of said neck and said shoulder for being closed around said neck against said anvil effectually at said juncture, said plate extending on both sides of the path of said staples and staple driver for protecting the hands of the operator from being struck thereby.

3. A machine for stapling closed filled containers of thin material having a neck portion and a shoulder portion between said neck and the filled body thereof, such as a sausage casing and the like, comprising a staple magazine, an anvil spaced from said magazine, a staple driver supported for driving successive staples from said magazine against said anvil, and a casing holder extending from said staple magazine at least to said anvil, said casing holder including a pair of parallel spaced plates on opposite sides of said anvil, said plates having an inwardly converging throat defining at their inner end a rounded opening immediately above said anvil for receiving and compressing the neck of the container to be stapled closed, at least one of said plates being of thin sheet material providing on its outer side a work face for receiving the shoulder of a casing pressed thereagainst and on its inner face guide means for guiding successive staples from said magazine to said casing neck at the point of the juncture of said neck and shoulder for being closed around said neck against said anvil with minimum space between said neck and the contents of said casing, said plates extending on both sides of the path of said staples and staple driver to protect the hands of the operator from being struck thereby.

References Cited in the file of this patent

UNITED STATES PATENTS

| | | |
|---|---|---|
| 557,378 | Gill | Mar. 31, 1896 |
| 1,125,385 | Opie | Jan. 19, 1915 |
| 1,131,321 | Bliss | Mar. 9, 1915 |
| 1,396,950 | Flavell | Nov. 15, 1921 |
| 1,908,981 | Hicks | May 16, 1933 |
| 2,172,847 | Nydegger et al. | Sept. 12, 1939 |
| 2,260,267 | Struve | Oct. 21, 1941 |